(12) United States Patent
Liu et al.

(10) Patent No.: US 9,182,483 B2
(45) Date of Patent: *Nov. 10, 2015

(54) METHOD AND SYSTEM FOR RANDOM STEERABLE SAR USING COMPRESSIVE SENSING

(71) Applicant: Mitsubishi Electric Research Laboratories, Inc., Cambridge, MA (US)

(72) Inventors: Dehong Liu, Lexington, MA (US); Petros T Boufounos, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 328 days.

This patent is subject to a terminal disclaimer.

(21) Appl. No.: 13/837,093

(22) Filed: Mar. 15, 2013

(65) Prior Publication Data

US 2014/0266869 A1    Sep. 18, 2014

(51) Int. Cl.
*G01S 13/90* (2006.01)

(52) U.S. Cl.
CPC ..... *G01S 13/9035* (2013.01); *G01S 2013/9052* (2013.01)

(58) Field of Classification Search
CPC ............... G01S 13/9035; G01S 13/90; G01S 2013/9052
USPC ............................................... 342/25 R–25 F
See application file for complete search history.

(56) References Cited

U.S. PATENT DOCUMENTS

| | | | |
|---|---|---|---|
| 2010/0001901 A1* | 1/2010 | Baraniuk et al. | 342/25 F |
| 2010/0141508 A1* | 6/2010 | Nguyen et al. | 342/25 F |
| 2011/0012778 A1* | 1/2011 | Nguyen et al. | 342/25 A |
| 2011/0175770 A1* | 7/2011 | Boufounos et al. | 342/25 A |
| 2012/0105276 A1* | 5/2012 | Ryland | 342/25 F |
| 2014/0077989 A1* | 3/2014 | Healy et al. | 342/25 F |
| 2014/0232590 A1* | 8/2014 | Jin | 342/25 F |
| 2014/0266869 A1* | 9/2014 | Liu et al. | 342/25 F |
| 2015/0061926 A1* | 3/2015 | Ranney et al. | 342/25 B |

* cited by examiner

*Primary Examiner* — John B Sotomayor
*Assistant Examiner* — Marcus Windrich
(74) *Attorney, Agent, or Firm* — Dirk Brinkman; Gene Vinokur

(57) ABSTRACT

A synthetic aperture radar image is generated by directing randomly a beam of transmitted pulses at an area using a steerable array of antennas, wherein the area is uniformly by the transmitted pulses while the array of antennas moves along a path. A sparse reconstruction procedure is applied to received signals from the area due to reflecting the transmitted pulses to generate the image corresponding to the area. The radar system can operate in either sliding spotlight mode, or scan mode. The area can be of an arbitrary shape, and a resolution of the image can be increased.

10 Claims, 4 Drawing Sheets

METHOD AND SYSTEM FOR RANDOM STEERABLE SAR USING COMPRESSIVE SENSING

FIELD OF THE INVENTION

This invention relates generally to synthetic aperture radar systems, and more particularly to scan mode and sliding spotlight mode radar systems.

BACKGROUND OF THE INVENTION

Monostatic synthetic aperture radar (SAR) systems provide a tradeoff between imaging resolution and ground area coverage. In strip-map SAR, the radar antenna is pointed at an area as the platform carrying the antenna moves along a path, collecting data to generate a radar image of a certain resolution and area size.

To meet different application requirements on imaging resolution and area coverage, radar antennas can also be steered, either electronically or mechanically, in different modes. When higher imaging resolution is required, the SAR system operates in spotlight mode by steering the antenna to always illuminate the same spot of interest, generating an image with higher imaging resolution and smaller coverage compared to strip-map mode SAR.

Intermediate SAR modes, such as sliding spotlight SAR (also named as hybrid stripmap/spotlight SAR), are also known. Those modes leverage a trade-off between stripmap and spotlight SAR to generate SAR images with improved azimuth resolution compared to strip mode, and improved ground coverage compared to spotlight.

In the sliding spotlight mode, the radar antenna is steered such that the beam centers intersect at a point farther away from the radar than the area being illuminated. If the intersection point moves closer to an imaging area plain, then the sliding spotlight mode turns to the spotlight mode. If the intersection point moves farther, to infinite, the mode becomes the stripmap mode. In that sense, the sliding spotlight mode is a generalization of both the spotlight mode and the stripmap mode.

When necessary to monitor a larger area, a scan mode SAR is preferred, whose antenna array is steered to scan the area of interest from spot to spot, yielding a larger area but much lower resolution image. However, in many applications, both large coverage and high resolution are desired. This is difficult to achieve in a conventional SAR system with a single baseline observation.

In recent years, the development of compressive sensing (CS) has had significant impact in sensing applications, including radar imaging. CS and its application to radar can be used to ease the trade-off between resolution and coverage. CS theory indicaes that signals may be reconstructed accurately using fewer measurements than previously thought possible. CS-based SAR systems need to measure far fewer reflections, compared to conventional SAR, to image the same area. Prior art work achieves improved resolution, or increased coverage, by randomizing the pulse timing or the beam steering and reconstructing using sparse optimization.

CS enables accurate reconstruction of signals using a smaller number of measurements compared to their Nyquist rate. This sampling rate reduction is achieved using randomized measurements, improved signal models and non-linear reconstruction algorithms. In SAR systems, this translates to significant resolution or coverage improvements. For example, the related applications demonstrate that it is possible to significantly increase an azimuth resolution without compromising the range coverage, and it is also possible to significantly increase the area covered, without compromise in the resolution.

SUMMARY OF THE INVENTION

The embodiments of the invention provide a randomly steerable SAR, to increase a resolution of a radar image, while maintaining a large coverage. The method uses compressive sensing (CS) techniques.

Compared to conventional scan mode and sliding spotlight mode SAR, the method and system provides greater flexibility on the steering. The invention provides higher imaging resolution, and flexible shapes of an imaging area.

At each pulse transmission, the beam center is steered randomly, such that the pulse randomly covers a spot located uniformly within a large area of interest. The randomization ensure that measurements acquire sufficient information for high resolution image reconstruction. The method can be pre-designed to fulfill the CS reconstruction requirement.

The SAR image of the large area is reconstructed, as a whole, using a CS based reconstruction process. As a result, the randomly steerable SAR system provides improved reconstruction performance, and more importantly, flexible shapes of imaged areas.

The focus is on the CS-based image reconstruction process, assuming random and uniform steering of beam centers. The measurements acquired by the randomly steerable SAR are treated as sub-Nyquist samplings of high sampling rate raw data, with missing data reconstructed by the CS techniques. A high resolution radar image is then generated based on the CS reconstructed radar echoes.

The system and method disclosed generalize spotlight SAR to produce a CS-SAR mode that resembles sliding spotlight mode SAR and scan mode SAR. When the spot centers are located in a straight line, the SAR system operates in a sliding spotlight mode. When the spot centers are random distributed in a 2-dimensional plane, the SAR system operates in a scan mode. The resulting system can achieve the same coverage as a typical sliding spotlight mode SAR or scan mode SAR, with significantly improved resolution. The CS-SAR mode exploits a randomly steered antenna array to achieve a larger effective aperture for each point in the imaged area, than the typical sliding spotlight or scan mode. Using CS-based signal models and reconstruction procedures, the method can reconstruct the image from the acquired data at much higher resolution, corresponding to a larger effective aperture.

In contrast to application Ser. No. 13/077,597, "High Resolution SAR Imaging Using Non-Uniform Pulse Timing," which randomized the timing of the transmitted pulses, the system here operates in the same way as a conventional SAR system. Pulses are transmitted and their echoes are received at a uniform pulse repetition frequency (PRF). In application Ser. No. 13/770,096 "System and Method for Multiple Spotlight Synthetic Radar Imaging Using Random Beam Steering," the covered area is partitioned in a small number of spots, and randomly steers the beam to cover one of spots in each pulse transmission. Each spot is imaged separately, and a separate image is reconstructed for each spot, resulting larger coverage without losing resolution.

The purpose of the system and method described here is to increase imaging resolution while maintain the same coverage. The system and method described here incorporates more flexible steering. Instead of partitioning the scene into a small number of spots, now at each pulse transmission, the beam center is steered randomly such that the beam covers a spot randomly located uniformly within the imaged area. The imaged area is reconstructed in its entirety, properly taking into account the leakage from the sidelobes of each beam. The resulting system provides improves reconstruction performance, and, more importantly, greater flexibility. In particular, the imaged area can have an arbitrary size, in contrast to the related application, in which the size had to be an integer multiple of the spotlight size.

DETAILED DESCRIPTION OF THE PREFERRED EMBODIMENTS

The embodiments of our invention provide a system and method for generating an image, wherein the image is a synthetic aperture radar (SAR) image. The embodiments on the CS-based image reconstruction process assume steerable beam of pulses. This can be realized by controlling the beam-pattern electronically, or by steering an array of antennas, mechanically.

By decomposing the underlying SAR image into sparse part and dense part, our imaging method reconstructs the sparse part using CS, and estimates the dense part using a least squares method. The incorporation of sparse modeling and least squares method outperforms conventional CS techniques using only sparsity regularization.

Figure 1B:
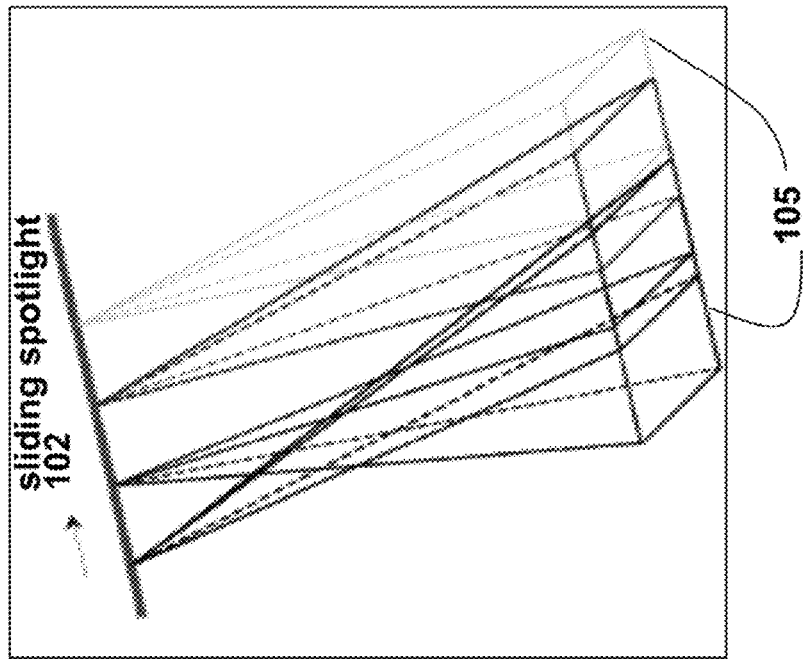
FIG. 1B is a schematic of a sliding spotlight SAR system according to embodiments of the invention.
Figure 1A:
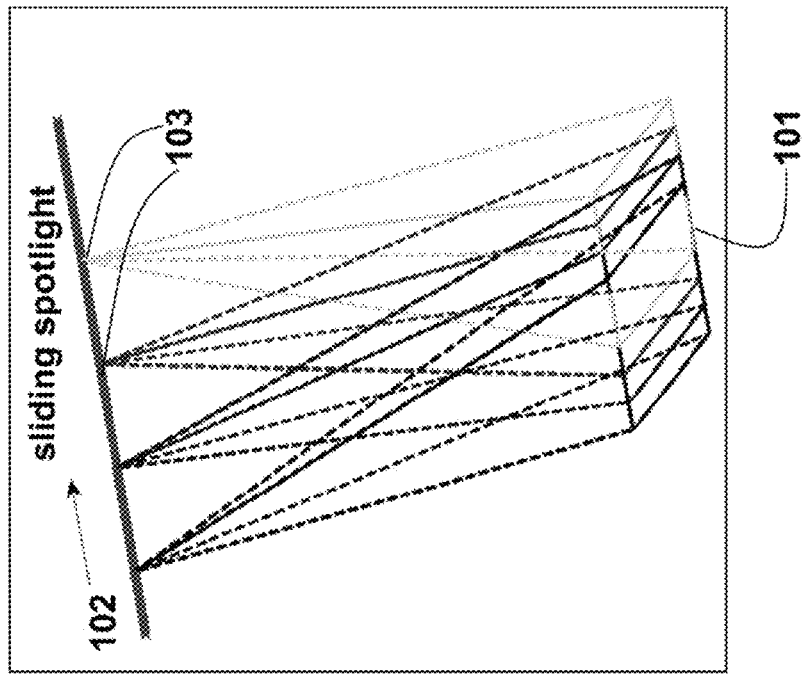
FIG. 1A is a schematic of a conventional synthetic aperture radar (SAR) system operating in sliding spotlight mode.

As shown in FIG. 1A, a conventional linear mono-static uniform virtual array operating in sliding spotlight mode. FIG. 2A shows a conventional system operating in scan. To image an area or scene 101, a mobile radar platform moves along the path 102 while transmitting pulse 103 at a uniform pulsing rate and measuring received signals reflected by the area of interest. In the conventional sliding spotlight mode, the transmitted pulse beam is uniformly steered such that its main lobe aims to a point farther away from the SAR system than the area of interest. Each reflection from the area is effectively a convolution of the transmitted pulse with the reflectivity of the spot illuminated by the pulse.

Thus, the data acquisition process can be modeled as a linear operation, $$y = \Phi x + n,$$

The goal of that image formation process is to determine the signal of interest x given the array echoes y and the acquisition function $\Phi$. A least squares solution is to use the pseudoinverse of $\Phi$ to determine x:

$$\hat{x} = \Phi^\dagger y.$$

In practical SAR systems, $\Phi$ is generally difficult to model accurately, and the inversion is computationally expensive. Typically, array image formation is achieved by using well-established procedures, such as the chirp-scaling algorithm and the wave-number algorithm, to approximate the inversion.

Figure 2B:
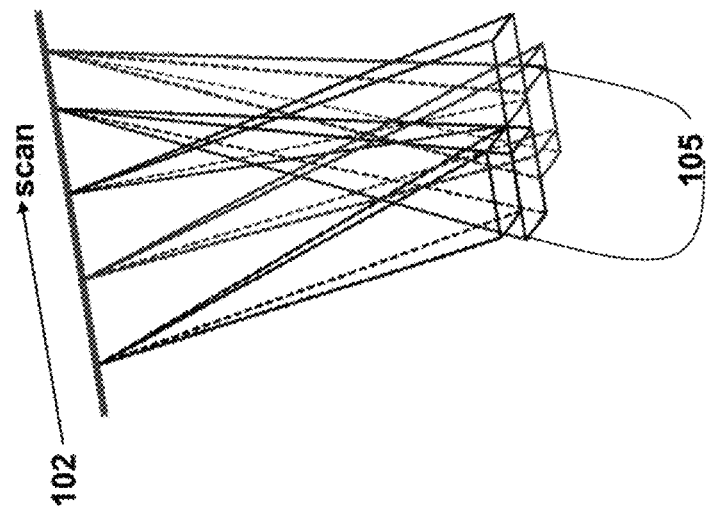
FIG. 2B is a schematic of a scan SAR system according to embodiments of the invention.
Figure 2A:
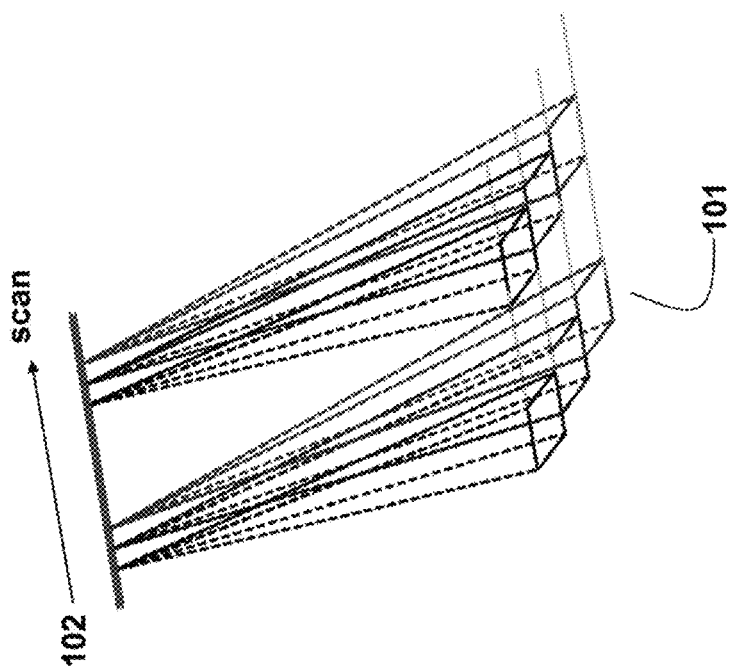
FIG. 2A is a schematic of a conventional synthetic aperture radar (SAR) system operating in scan mode.

As shown in FIGS. 1B and 2B, our SAR system operates by uniformly transmitting pulses and receiving echoes in sliding spotlight mode or scan mode SAR. The difference is in the randomized array steering. Instead of steering the array to always illuminate the same spot or an adjacent sliding spot, as the array moves, we illuminate different spots 105 at random locations within the area of interest. Each spot can be the same size. In contrast with the prior art, the area of interest can have an arbitrary shape.

Each point in the measured scene is illuminated from several positions in the mobile platform path. These positions are randomly selected from all the positions at which the platform transmits pulses, which are regularly spaced on the path of the platform. Thus, the effective aperture for each point is the scene is the entire path of the platform, similar to conventional spotlight mode. In contrast, in sliding spotlight mode or scan mode, a point is illuminated for only part of the platform path, making the effective aperture much smaller.

The gain in effective aperture does cause complications. If the scene size increases, and keeping all other parameters the same, each point in the scene receives fewer pulses to illuminated, i.e., is measure fewer times. In other words, the same number of measurements is used to recover a larger scene. For a larger scene to be recoverable using CS methods, it should also be sparser or, in general, exhibit more structure. The sparsity, or other structure, of the scene finally determines the trade-off of how much the resolution can be improved over the conventional sliding spotlight SAR or scan mode SAR, or the area covered over conventional SAR.

Here, we focus on the CS procedure to reconstruct the image for the area from the acquired measurements. After the randomized steering of the array beam is determined, the resulting acquisition could be modeled by the linear system $\hat{x} = \Phi^\dagger y$. However, in this case, and in contrast to conventional SAR operation, the system $\Phi$ is underdetermined, i.e., it cannot be inverted in a straightforward manner.

To perform the inversion in conventional CS, x is generally treated as a sparse signal. That model is generally not accurate for radar imaging. While strong components in some domain might exist in radar imaging, the residual always seems large and difficult to take into account.

Figure 3:
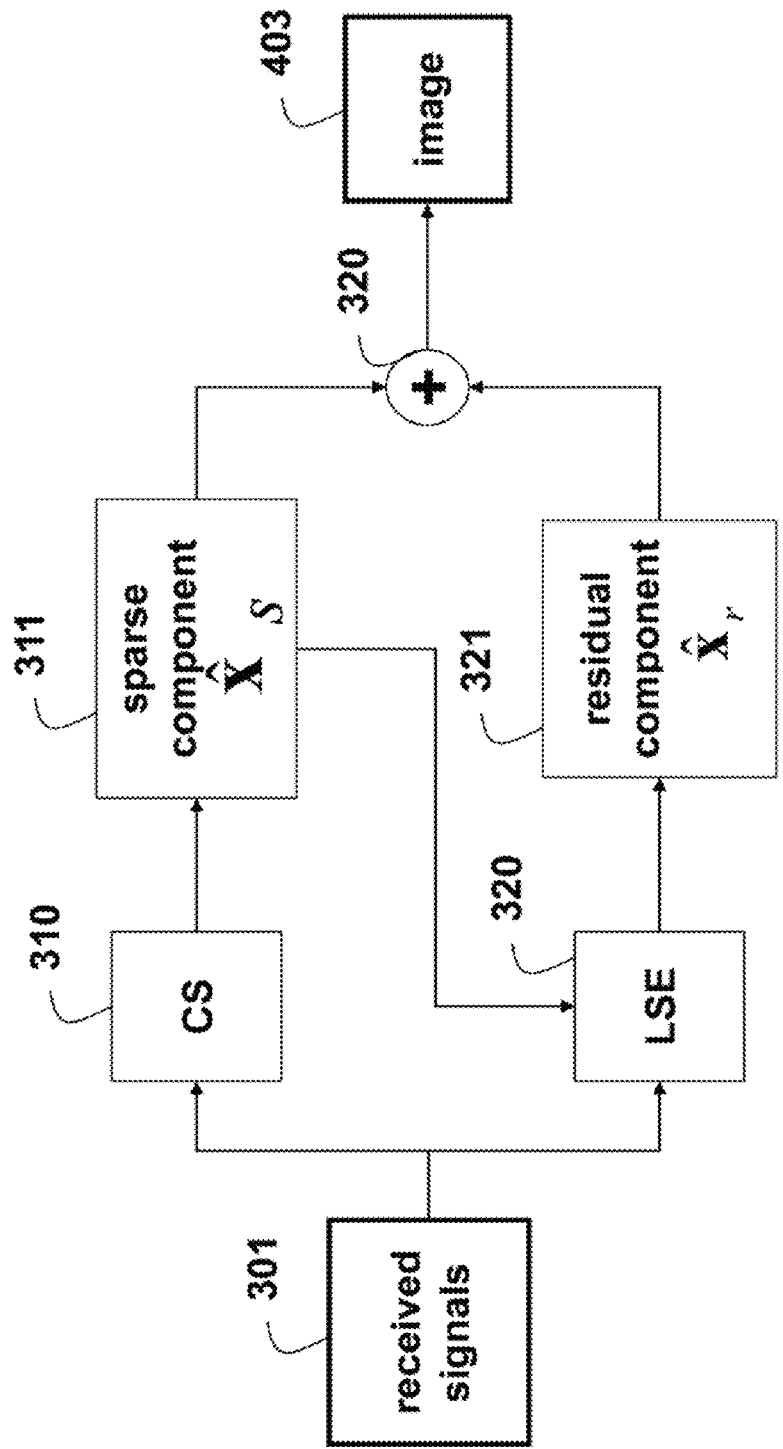
FIG. 3 is a block diagram of a system and method for generating an image using a randomly steered sysnthetic aperature radar system according to embodiments of the invention.

As shown in FIG. 3, instead of simply treating x as a sparse signal, we decompose x into sparse part $x_s$ 311, and a dense residual $x_r$ 321:

$$x = x_s + x_r.$$

Therefore, we model a synthetic aperture radar (SAR) acquisition process as a linear operation, i.e., each reflection from an area of interest (spot) is effectively a convolution of a transmitted pulse with the reflectivity of the spot illuminated by the pulse, as indicated by the linear system expressed by the following equation:

$$y_i = A_i x + n, \quad (1)$$

where $y_i$ 301 denotes the received radar signals (echoes) corresponding to the $i^{th}$ transmitted pulse, x denotes the complex valued reflectivity of the spot, the matrix $A_i$ describes the SAR pulsing and acquisition system and n is noise.

The system described in the matrix $A_i$ models the effect of the beam steering at the $i^{th}$ pulse transmission. To construct an image of the spot, we first determine the sparse component $\hat{x}_s$ using a compressive censing (CS) program 310:

$$\hat{x}_s = \underset{x}{\operatorname{argmin}} \sum_i \|y_i - A_i x\|_2^2 \text{ s.t. } \|x\|_0 < N. \quad (2)$$

Then, the residual $\hat{y}_{r,i} = y_i - A_i \hat{x}_s$, is used to produce a least squares estimate (LSE) 321 of the dense component of x. The total estimate is the sum 320 of the two components:

$$\hat{x} = \hat{x}_s = A^\dagger \hat{y}_r, \quad (3)$$

where A and $\hat{y}_r$, describe the combined system and the residual for all pulses i. For efficient computation, the linear systems $A_i$ can be determined using a wave-number process, considering the large offset (squint angle) from the normal of the plane of the antenna.

The final image 403 is not sparse, but rather a combination of the sparse component, estimated using sparsity regularization, and the dense component estimated using least-squares regularization. The reconstruction method can be performed in a processor connected to memory and input/output interfaces as known in the art.

Figure 4:
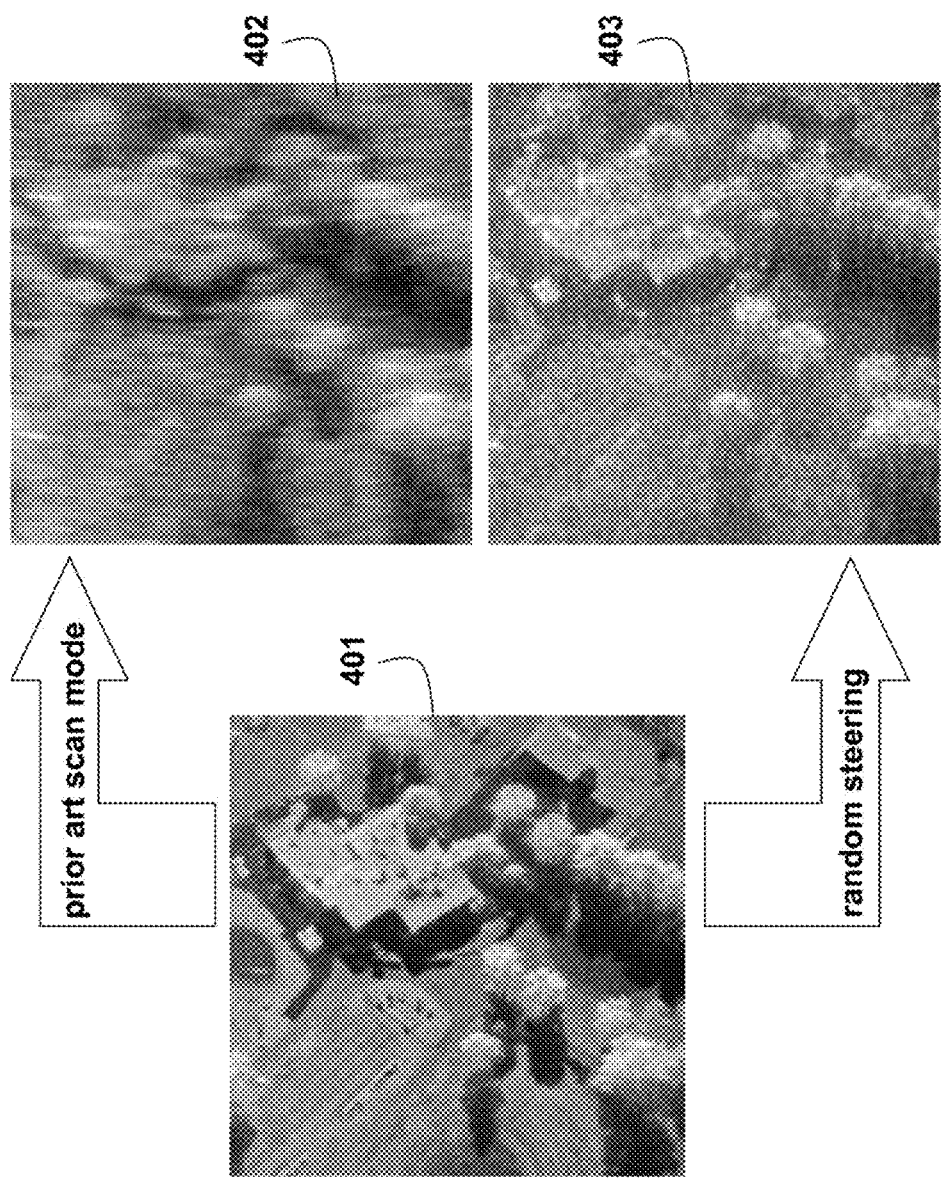
FIG. 4 includes images comparing results obtain for the SAR acquisition using conventional scan mode SAR, and randomly a steered SAR system according to embodiments of the invention.

FIG. 4 compares the results obtain for the SAR acquisition on an area 401 with complex-valued ground reflectivity using both conventional scan mode SAR, and our randomly steered SAR system, and respectives reconstructed images 402 and 403. We present a magnitude of the true ground reflectivity 401. The image 402 is produced by the conventional scan mode SAR, which covers the whole area but exhibits very low resolution. The image 403 is result of using our randomly steered SAR, with our CS reconstruction method. As evident in the images, the reconstructed image using the randomized acquisition is much sharper compared to the scan mode acquisition. The fine structures in the ground are significantly less blurred in the randomly steerable SAR compared to the conventional scan mode SAR.

The reason is that the effective aperture of the randomly steered mode is much larger than that of the scan mode. Thus, using the signal model, our method is able to exploit the structure of the image by identifying strong reflectors, and reconstructing the strong reflectors at a much higher resolution.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for generating an image, wherein the image is a synthetic aperture radar (SAR) image, comprising the steps of:
    directing a beam of transmitted pulses at an area using a steerable array of antennas, wherein the beam is randomly directed at the area by the steerable array, wherein the area is uniformly illuminated by the transmitted pulses while the array of antennas moves along a path, and wherein spots in the area illumined by the beam are random distributed in a 2-dimensional plane; and
    applying a reconstruction procedure to received signals from the area due to reflecting the transmitted pulses to generate the image corresponding to the area, wherein the steps are performed in a processor.

2. The method of claim 1, wherein the image is a combination of a sparse component and a residual component, and wherein the reconstruction method further comprises the steps of:
    applying a compressive sensing procedure to generate the sparse component; and
    applying a least square regularization to generate the residual component.

3. The method of claim 1, wherein the directing is in a sliding spotlight mode.

4. The method of claim 1, wherein the directing is in a scan mode.

5. The method of claim 1, wherein the area has an arbitrary shape.

6. The method of claim 1, wherein a resolution of the image is increased.

7. The method of claim 1, wherein the directing is from a mobile platform, and wherein each spot in the area is illuminated from several positions along a path of the mobile platform.

8. The method of claim 2, wherein the sparse component is used to generate a dense component.

9. A system for generating an image, wherein the image is a synthetic aperture radar (SAR) image, comprising:
    a transmitter configured to emit randomly a beam of pulses at an area using a steerable array of antennas, wherein the area is uniformly illuminated by the pulses while the array of antennas moves along a path, and wherein spots in the area illumined by the beam are random distributed in a 2-dimensional plane; and
    a processor configured to apply a reconstruction procedure to received signals from the area due to reflecting the pulses to generate the image corresponding to the area.

10. A system for generating an image, wherein the image is a synthetic aperture radar (SAR) image, comprising:
    a steerable array of antennas configured to direct a beam of transmitted pulses at an area, wherein the beam is randomly directed at the area by the steerable array, wherein the area is uniformly illuminated by the transmitted pulses while the array of antennas moves along a path, and wherein spots in the area illumined by the beam are random distributed in a 2-dimensional plane; and
    a processor, wherein the processor includes a reconstruction procedure applied to received signals from the area due to reflecting the transmitted pulses to generate the image corresponding to the area.

* * * * *